T. HOULAHAN.
Apparatus for Packing Meat in Cans.

No. 216,569.                    Patented June 17, 1879.

Attest.
Saml. S. Boyd
W. J. Kiel

Inventor.
Thomas Houlahan
by Chas. D. Moody
atty.

N. PETERS, PHOTO-LITHOGRAPHER, WASHINGTON, D. C.

UNITED STATES PATENT OFFICE.

THOMAS HOULAHAN, OF ST. LOUIS, MISSOURI.

IMPROVEMENT IN APPARATUS FOR PACKING MEAT IN CANS.

Specification forming part of Letters Patent No. 216,569, dated June 17, 1879; application filed January 15, 1879.

*To all whom it may concern:*

Be it known that I, THOMAS HOULAHAN, of St. Louis, Missouri, have made a new and useful Improvement in Apparatus for Packing Meat in Cans, of which the following is a full, clear, and exact description, reference being had to the annexed drawings, making part of this specification, in which—

Figure 1:
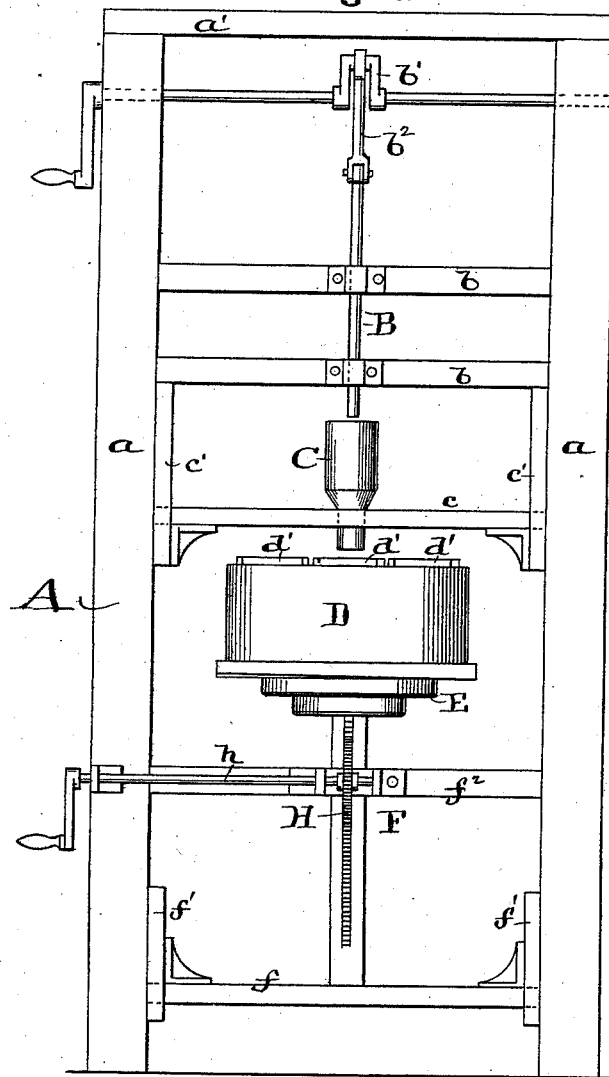
Figure 2:
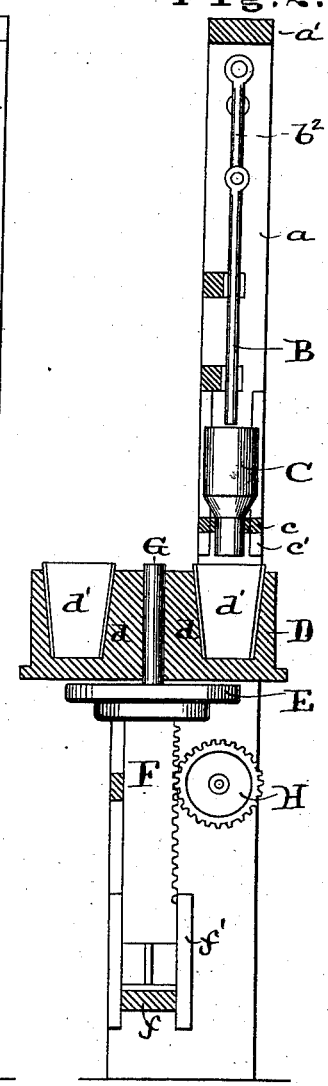
Figure 3:
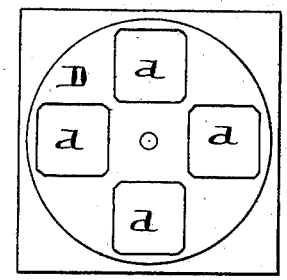
Figure 4:
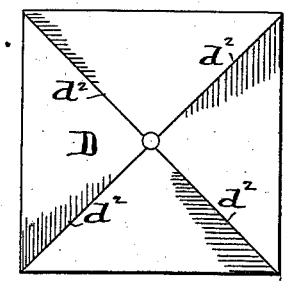
Figure 5:
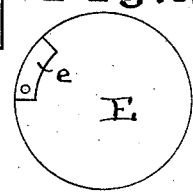

Figure 1 is an elevation of the apparatus; Fig. 2, a central vertical section, taken at right angles to the view of Fig. 1; Figs. 3 and 4, respectively, a top and a bottom view of the can-holding cylinder; and Fig. 5, a top view of the table that supports the cylinder and showing the pawl.

Similar letters denote similar parts.

In canning meat it is customary to compress the meat in the cans by means of a plunger, which, to pass through the opening in the top of the can, is smaller in diameter than the can. The practice has been to fill the can gradually, and to compress each portion of the meat as it is placed in the can, and as the can is filled, and the contents of the can increase in depth, the stroke of the plunger is gradually and correspondingly shortened. The meat bulges upward around the plunger as the latter makes its stroke, and the result of this mode of compressing the meat in the can is that that portion first inserted is not fully compressed, and when the last portion of the meat is inserted it has to be over-compressed in order to transmit sufficient pressure to the meat beneath it. The result of this excessive pressure upon the upper portion of the contents is a separation of the fat, which is often the occasion of the spoiling of the meat ultimately, for when the can is afterward subjected to the process the heat employed brings the fat into such a condition as to cause the contents of the can to rapidly spoil in warm weather.

It is my present aim to provide means for compressing the meat more evenly, and so that the fat is not separated from the meat, and to provide for canning meat rapidly.

Referring to the drawings, A represents the frame of the apparatus, consisting preferably of the uprights $a\ a$, united by a suitable cross-bar, $a'$. The apparatus consists mainly of three parts: A plunger, B, having a vertical reciprocating movement; a hopper, C, to deliver the meat to the can, and through which the plunger works, and a chambered cylinder or die, D, to hold the cans while the meat is being packed. The plunger passes through guides $b$, and it may receive its motion from any suitable source—say, the crank $b^1$, which is connected with the plunger by means of the link $b^2$, and is operated in any desirable way, either by hand or steam power. The hopper is made vertically adjustable both with reference to the die and cans beneath, and also to the plunger. To that end it is supported in a plate, $c$, the ends of which are arranged to move up and down in guides $c'\ c'$ upon the uprights $a\ a$. The plate is perforated to allow the lower end of the hopper to pass down through and project slightly below it. The plate carrying the hopper is arranged to be lifted by the die as the latter is raised, as hereinafter described, and for this purpose the plate and die are relatively arranged so that the latter in its rise encounters the former. The plate and hopper may fall by gravity simply. The downward limit of their movement is at a point which brings the lower end of the hopper sufficiently above the cans in the die when the latter is depressed to enable the die to be rotated, as hereinafter described.

The cylinder or die D rests upon a table, E, which in turn rests upon and is attached to a rack, F, that has a provision for its vertical adjustment. The die is also arranged to be turned horizontally on a spindle, G, which is attached to the table E. The die is chambered at $d\ d\ d\ d$ to receive the cans $d^1\ d^1$, in which the meat is packed, the chambers being made in shape and size to conform to the cans, so that the latter may fit snugly in the chambers. The chambers are arranged uniformly around the center of the die, and the die and chambers and the other parts of the apparatus are so arranged relatively that, as the die is turned on the spindle G, the cans in the die are successively brought under the plunger, and so that the lower end of the hopper shall enter the can when the die is raised.

To readily bring the cans exactly into position as the die is rotated, and to hold them steadily, the bottom of the die is provided with teeth $d^2\ d^2\ d^2\ d^2$, with which a spring-pawl, $e$, that is attached to the table E, engages.

The teeth correspond in number to the chambers $d\ d\ d\ d$, and are arranged so that the pawl drops against the face of the tooth as the corresponding chamber comes under the hopper. A pinion, H, on the shaft $h$ is used to raise and lower the rack F. The rack, as shown, is attached to a guide-bar, $f$, the ends of which engage in grooves $f^1\ f^1$ in the uprights $a\ a$. The upper end of the rack passes through a guide, $f^2$.

In operation, the die is filled with cans, and then, by means of the rack and pinion, is raised so that the lower end of the hopper enters the can a short distance. The can is then nearly filled, the meat falling into the can without being compressed. The die carrying the hopper is then raised sufficiently to enable the plunger (which is working continuously) to strike down nearly or quite to the bottom of the can. This operates to pack the meat at once, compressing it evenly and solidly into all parts of the can, saving at the central portion of the top, which is then filled by the remnant of meat remaining in the hopper. The effect of this mode of packing is to keep the fatty portion of the meat from being squeezed out from the rest, which separation is always objectionable in packed meats. In this way the operation of compressing is kept under control, the meat is evenly compressed, and no portion of it is subjected to excessive pressure.

As soon as the can is filled the die is depressed to its lowest limit, and sufficiently for the can to be entirely separated from the hopper, whereupon the die is turned on the spindle, bringing the can just filled into position to be taken out of the die and an empty can inserted in its place. The same movement brings a second can beneath the hopper and the operation is repeated.

I claim—

1. The combination of the plunger B, the vertically-adjustable hopper C, and the rotating die D, substantially as described.

2. The combination of the plunger B, the vertically-adjustable hopper C, and the vertically adjustable and rotating die D, substantially as described.

3. The combination of the vertically adjustable and rotating die D and the hopper C, substantially as described.

4. The combination of the die D, having the chambers $d\ d\ d\ d$ and teeth $d^2\ d^2\ d^2\ d^2$, and the table E, having the pawl $e$, substantially as described.

5. The combination of the rack F, pinion H, table E, spindle G, die D, and plunger B, substantially as described.

6. The combination of the rack F, pinion H, table E, spindle G, die D, plunger B, hopper C, and plate $c$, substantially as described.

7. The combination of the vertically-adjustable hopper C and the rotating die D, substantially as described.

8. The combination, in a meat-canning apparatus, of the plunger B, the vertically-adjustable plate $c$, and the hopper C, the latter being vertically adjustable upon the plunger, but its movement being independent of the movement of the plunger, and the stroke of the plunger extending uniformly to the same limit.

9. The combination of the plunger B, the vertically-adjustable hopper C, and a die having a series of chambers, $d\ d\ d\ d$, substantially as described.

Witness my hand.

THOMAS HOULAHAN.

Witnesses:
CHAS. D. MOODY,
SAML. S. BOYD.